United States Patent
Nishimiya et al.

(10) Patent No.: US 9,250,737 B2
(45) Date of Patent: Feb. 2, 2016

(54) INFORMATION APPARATUS

(71) Applicant: PANASONIC INTELLECTUAL PROPERTY MANAGEMENT CO., LTD., Osaka (JP)

(72) Inventors: Yusaku Nishimiya, Osaka (JP); Hideaki Ishiba, Kyoto (JP); Yoshiyuki Hayashi, Osaka (JP); Tsutomu Nakanishi, Fukui (JP); Narihiro Mita, Osaka (JP); Yuichi Mizuno, Fukui (JP); Hideo Ohkoshi, Osaka (JP); Taketoshi Takashima, Fukui (JP); Yoshimitsu Ikeyama, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/398,955

(22) PCT Filed: Jun. 21, 2013

(86) PCT No.: PCT/JP2013/003886
§ 371 (c)(1),
(2) Date: Nov. 4, 2014

(87) PCT Pub. No.: WO2013/190850
PCT Pub. Date: Dec. 27, 2013

(65) Prior Publication Data
US 2015/0138106 A1 May 21, 2015

(30) Foreign Application Priority Data

Jun. 22, 2012 (JP) .................... 2012-140505
Sep. 28, 2012 (JP) .................... 2012-215894

(51) Int. Cl.
| G06F 1/00 | (2006.01) |
| G06F 3/041 | (2006.01) |
| G06F 3/0485 | (2013.01) |
| H04M 1/23 | (2006.01) |
| G06F 3/0484 | (2013.01) |

(52) U.S. Cl.
CPC ............ *G06F 3/0414* (2013.01); *G06F 3/0485* (2013.01); *G06F 3/04847* (2013.01); *H04M 1/23* (2013.01)

(58) Field of Classification Search
CPC ..... G06F 1/00; G06F 17/5018; G06F 3/0414; G06F 3/016; G06F 3/045; G06F 3/048; G06F 3/00; G06F 3/02
See application file for complete search history.

(56) References Cited

U.S. PATENT DOCUMENTS

| 2009/0079698 A1* | 3/2009 | Takashima ............ G06F 3/0224 345/169 |
| 2009/0103250 A1 | 4/2009 | Takashima et al. |
| 2010/0085317 A1 | 4/2010 | Park et al. |

FOREIGN PATENT DOCUMENTS

| EP | 2175344 A2 | 4/2010 |
| JP | 2001-069223 A | 3/2001 |

(Continued)

OTHER PUBLICATIONS

International Search Report issued in International Application No. PCT/JP2013/003886 dated Sep. 10, 2013, with English translation.

*Primary Examiner* — Michael Faragalla
(74) *Attorney, Agent, or Firm* — McDermott Will & Emery LLP

(57) ABSTRACT

An information apparatus includes a housing, first and second strain detectors, and first and second stress collectors that transmit distortion applied to a side surface of the housing to the first and the second strain detectors, respectively. Upon having the same amount of distortion is applied to the side surface of the housing, the first and strain detectors outputs different values a processing circuit. This information apparatus has a small size and can be accurately controlled.

19 Claims, 19 Drawing Sheets

(56) References Cited

FOREIGN PATENT DOCUMENTS

| JP | 2006-018505 A | 1/2006 |
|----|---------------|--------|
| JP | 2009-093619 A | 4/2009 |
| JP | 2009-136848   | 6/2009 |
| JP | 2010-108891   | 5/2010 |
| JP | 2010-117842 A | 5/2010 |
| JP | 2011-164042 A | 9/2011 |
| JP | 2012-109508   | 6/2012 |

* cited by examiner

INFORMATION APPARATUS

RELATED APPLICATIONS

This application is the U.S. National Phase under 35 U.S.C. §371 of International Application No. PCT/JP2013/003886, filed on Jun. 21, 2013, which in turn claims the benefit of Japanese Application No. 2012-140505, filed on Jun. 22, 2012, and Japanese Application No. 2012-215894, filed on Sep. 28, 2012, the disclosures of which are incorporated by reference herein.

TECHNICAL FIELD

The present invention relates to information apparatuses that execute a variety of controls with a simple operation, based on a compressive stress applied to a housing of the apparatus. The controls include scroll, expansion or reduction of a display screen, and adjustment of a sound volume.

BACKGROUND ART

Portable information apparatuses, such as a digital camera, portable personal computer (PC), portable game machine, portable phone, and personal digital assistance (PDA), have been widely used by users carrying these apparatuses with them.

FIG. 19 is a perspective view of a conventional information apparatus, portable phone 201, disclosed in PTL 1. Portable phone 201 has display section 202 (e.g. liquid crystal display) on a front surface thereof to display letters, numerals, marks, and so on. Scroll bars 203 and 204 implemented by touch-pads are disposed near the lower end and the left-end of display section 202 respectively for a user to scroll a display horizontally and vertically with finger 205, so that the user can scroll the display in two dimensions.

FIG. 20 is a plan view of another conventional information apparatus, portable phone 206, disclosed in PTL 2. Portable phone 206 includes a rectangular and thin housing, display screen 211 disposed on a front surface of the housing, touch-pads 207 to 210 disposed on four side surfaces of the housing, respectively. Each of touch-pads 207 to 210 has a long and narrow shape having a longitudinal direction parallel to display screen 211. A sliding operation in parallel to screen 211 onto each of touch-pads 207 to 210 scrolls a display on screen 211, rolling an image on the display, or changing a display magnification.

FIG. 21 is an enlarged view of still another information apparatus, input device 212, disclosed in PTL 3. In input device 212, a sensor disposed in housing 213 instead of touch-pads detects a sliding operation performed by a user in order to operate a screen. Input device 212 includes, in housing 213, flexible printed circuit board (FPC) 214 having an electro-static sensor sheet mounted thereto. FPC 214 having a sheet shape has sensor sheet 215 on a surface thereof for detecting the slide operation. Sensor sheet 215 is implemented by an electrostatic sensor sheet. Sensor sheet 215 disposed on the surface of FPC 214 is operable to, upon a sliding operation by a user with finger 217, depress key top 216 to depress key-part 219, and then cause contact-electrode 220 to touch projection 222 via dome-switch 221 to detect a position to which the sliding operation is performed, and output a position detecting signal.

CITATION LIST

Patent Literature

PTL 1: Japanese Patent Laid-Open Publication No. 2001-69223

PTL 2: Japanese Patent Laid-Open Publication No. 2010-117842

PTL 3: Japanese Patent Laid-Open Publication No. 2009-93619

SUMMARY

An information apparatus includes a housing, first and second strain detectors, and first and second stress collectors that transmit distortion applied to a side surface of the housing to the first and the second strain detectors, respectively. Upon having the same amount of distortion is applied to the side surface of the housing, the first and strain detectors outputs different values a processing circuit. This information apparatus has a small size and can be accurately controlled.

DETAIL DESCRIPTION OF PREFERRED EMBODIMENTS

Exemplary Embodiment 1

Figure 1A:
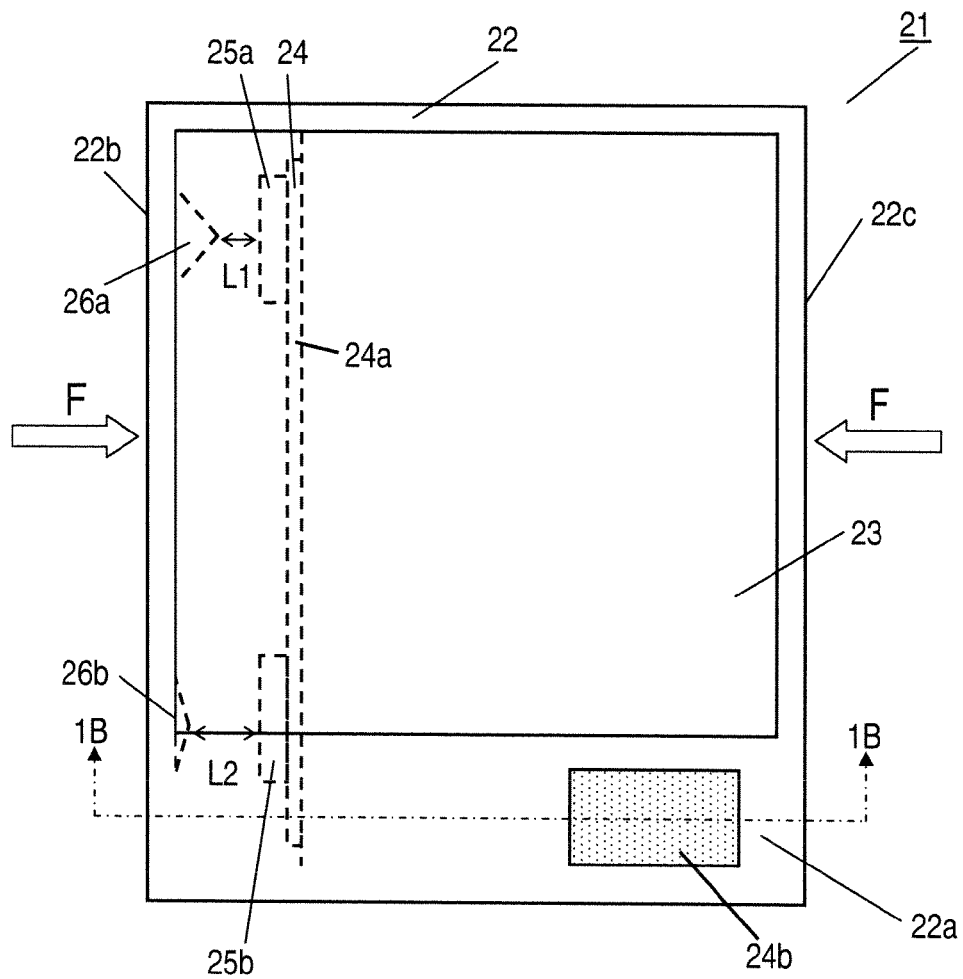
FIG. 1A is a plan view of an information apparatus in accordance with Exemplary Embodiment 1 of the present invention.
Figure 1B:
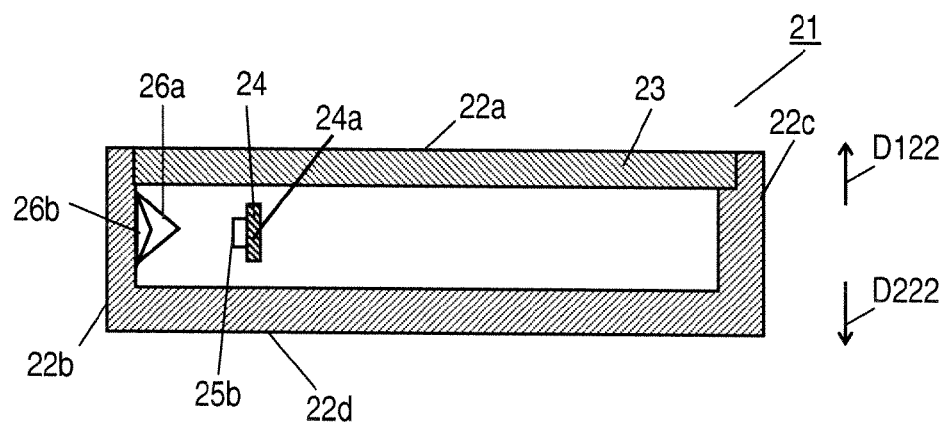
FIG. 1B is a sectional view of the information apparatus at line 1B-1B shown in FIG. 1A.

FIG. 1A is a plan view of information apparatus 21 in accordance with Exemplary Embodiment 1 of the present invention. FIG. 1B is a sectional view of information apparatus 21 at line 1B-1B shown in FIG. 1A. Housing 22 has front surface 22a, back surface 22d opposite to front face 22a, side surfaces 22b and 22c connected to front surface 22a and back surface 22d. Side surfaces 22b and 22c are located opposite to each other with respect to front surface 22a. Display screen 23, such as a liquid crystal display, and operating keys are disposed on front surface 22a. Information apparatus 21 includes housing 22, board 24 connected to housing 22 with an inner chassis, strain detectors 25a and 25b disposed on board 24, stress collectors 26a and 26b disposed on side surface 22b of housing 22, processing circuit 24a mounted to board 24, and audio output section 24b, such as a loudspeaker or an ear-phone jack, mounted to housing 22. Strain detectors 25a and 25b face side surface 22b while stress collectors 26a and 26b face strain detectors 25a and 25b, respectively. As shown FIG. 1A, in a thickness direction, stress collector 26a has a length larger than that of stress collector 26b. Distance L1 between strain detector 25a and stress collector 26a is different from distance L2 between strain detector 25b and stress collector 26b. Distance L1 is smaller than distance L2. Board 24 has electronic components, such as a CPU, mounted thereon. These components are electrically connected to strain detector 25b. A distortion occurring on back surface 22d is transmitted by stress collectors 26a and 26b to strain detectors 25a and 25b, and causes strain detectors 25a and 25b to generate electric signals which are then processed by processing circuit 24a. Processing circuit 24a outputs an audio signal to audio output section 24b, thereby causing audio output section 24b to output sounds.

The above configuration allows board 24 having strain detectors 25a and 25b mounted thereon to be mounted not directly to housing 22 of information apparatus 21. This structure thus provides information apparatus 21 with a large degree of freedom in designing. On top of that, board 24 is connected directly or indirectly via stress collectors 26a and 26b to an inner surface of housing 22, so that smaller compressive load applied to the surface of housing 22 may cause strain detectors 25a and 25b to output a signal large enough for information apparatus 21 to be controlled more accurately.

Stress collectors 26a and 26b may be integrated with side surface 22b or bonded to side surface 22b with adhesive.

Figure 2A:
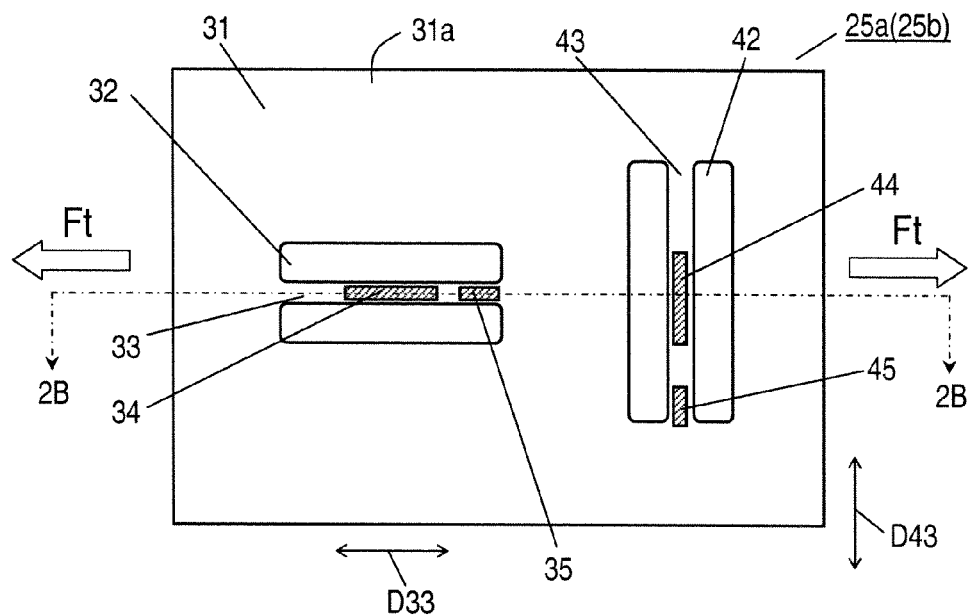
FIG. 2A is a plan view of a strain detector of the information apparatus in accordance with Embodiment 1.
Figure 2B:
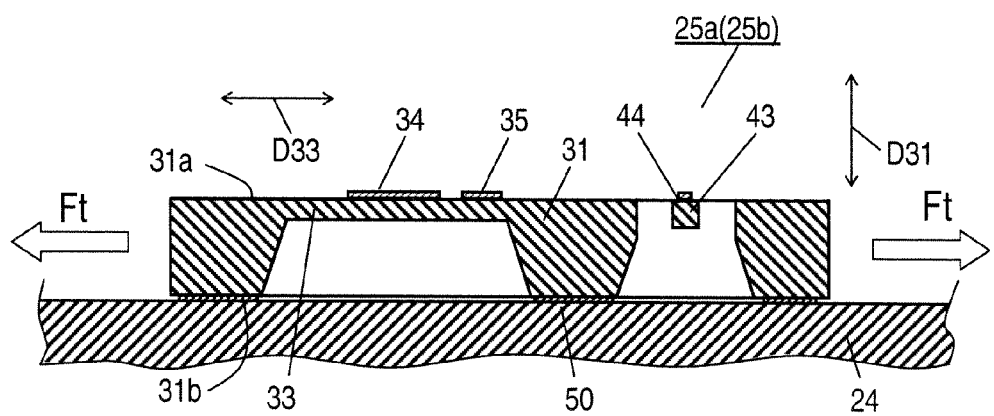
FIG. 2B is a sectional view of the strain detector at line 2B-2B shown in FIG. 2A.

FIG. 2A is a plan view of strain detector 25a (25b) of information apparatus 21 in accordance with Embodiment 1. FIG. 2B is a sectional view of strain detector 25a (25b) at line 2B-2B shown in FIG. 2A. Strain detector 25b has the same structure as strain detector 25a.

As shown in FIGS. 2A and 2B, strain detector 25a includes substrate 31 made of semiconductor material such as silicon. Substrate 31 has an insulating layer provided at a surface thereof. The insulating layer is made of a silicon oxide layer or a silicon nitride layer. Oscillators 32 and 42 are disposed on surface 31a of substrate 31. Oscillator 32 includes vibrator 33 formed by etching the substrate 31, sensing element 34, and driving element 35. Sensing element 34 and driving element 35 are disposed on a surface of vibrator 33. Vibrator 33 has a beam shape and has a natural frequency that is changed by an amount of load applied thereto. Sensing element 34 is disposed at a center of the beam shape of vibrator 33, and driving element 35 is disposed at an end of the beam shape of vibrator 33. Each of sensing element 34 and driving element 35 includes a lower electrode disposed on vibrator 33, a piezoelectric layer disposed on the lower electrode and made of piezoelectric material, such as lead zirconate titanate (PZT), and an upper electrode disposed on the piezoelectric layer. Sensing element 34 and driving element 35 are connected to electronic components mounted to board 24 via wiring patterns.

Oscillator 42 has the same structure as oscillator 32, and includes vibrator 43 formed by etching the substrate 31, sensing element 44, and driving element 45. Sensing element 44 and driving element 45 disposed on a surface of vibrator 43. Vibrator 43 has a beam shape and has a natural frequency that is changed by an amount of a load applied thereto. Sensing element 44 is disposed at a center of the beam shape of vibrator 43. Driving element 45 is disposed at an end of the beam shape of vibrator 43. Each of sensing element 44 and driving element 45 includes a lower electrode disposed on vibrator 43, a piezoelectric layer disposed on the lower electrode and made of piezoelectric material, such as PZT, and an upper electrode disposed on the piezoelectric layer. Sensing element 44 and driving element 45 are connected to electronic components mounted to board 24 via wiring patterns.

Bottom surface 31b of substrate 31 is connected and fixed to board 24 with material 50 made of metal-based jointing material, such as Au—Au joint, or epoxy resin, having rigidity. This joint transmits a distortion occurring on side surface 22b of housing 22 to oscillators 32 and 42. Longitudinal direction D43 in which the beam shape of vibrator 43 of oscillator 42 extends is perpendicular to longitudinal direction D33 in which the beam shape of vibrator 33 of oscillator 32 extends.

When an alternating-current (AC) voltage having a frequency close to the natural frequency fa of vibrator 33 is applied from board 24 to driving element 35 of oscillator 32, driving element 35 causes vibrator 33 to vibrate to expand and contract in longitudinal direction D33 of vibrator 33. This expanding and contracting vibration provides vibrator 33 with string vibration in direction D31 perpendicular to direction D33. This string vibration is received by sensing element 34. Sensing element 34 then generates an AC signal having a frequency equal to natural frequency fa of vibrator 33. This AC signal is adjusted in phase and amplified in board 24, and then is fed back to driving element 35. This configuration allows vibrator 33 to maintain the string vibration in direction D31 at the frequency equal to natural frequency fa. Similarly, a signal process in board 24 allows vibrator 43 to maintain string vibration in direction D31 at a frequency equal to natural frequency fb.

While vibrators 33 and 43 of oscillators 32, 42 maintains string vibration in direction D31, load Ft parallel with longitudinal direction D33 applied to side surface 22b of housing 22 causes strain detector 25a (25b) to expand in longitudinal direction D33 of vibrator 33, and causes vibrator 43 to contract in longitudinal direction D43 by a length corresponding to a Poisson ratio of side surface 22b of housing 22. This configuration allows vibrator 33 to receive an expanding force along longitudinal direction D33, so that a vibration frequency of vibrator 33 may increase from frequency fa to a frequency (fa+fa1). Simultaneously to this, vibrator 43 receives a compressive force along longitudinal direction D43, so that a vibration frequency of vibrator 43 may decrease from frequency fb to a frequency (fb−fb1). Calculation of the difference between the vibration frequencies of vibrators 33 and 43 allows strain detectors 25a and 25b to measure the load Ft applied to side surface 22b of housing 22 at high sensitivity. Since vibrators 33 and 43 are made of the same material, namely, semiconductor material, the vibration frequencies of those vibrators are changed by a temperature change in the same direction and in the same amount. The variation in the vibration frequencies due to the temperature change can be thus cancelled, and the load applied to back surface 22d of housing 22 can be thus accurately measured.

As shown in FIGS. 1A and 1B, when a user applies compressive load F on side surface 22b of housing 22 with a finger in such a direction that side surface 22b approaches side surface 22c, in other words, applies compressive load F toward inside housing 22, front surface 22a and back surface 22d of housing 22 warp in directions D122 and D222, respectively, namely, front surface 22a and back surface 22d warp to be removed away from housing 22. This configuration allows strain detector 25a to stretch in longitudinal direction D33 of vibrator 33, and vibrator 43 to shrink in longitudinal direction D43 of vibrator 43 by a length corresponding to the Poisson ratio of side surface 22b of housing 22. This action increases the difference between the vibration frequencies of vibrators 33 and 43 of strain detector 25a (25b), namely, increases a difference (fa−fb) to a difference (fa−fb)+(fa1+fb1) by a difference (fa130 fb1). On the other hand, while the user holds housing 22 with a thumb and a middle finger, the user applies compressive load F to both front surface 22a and back surface 22d inward housing 22 such that front surface 22a approaches back surface 22d, and then, strain detector 25a (25b) shrinks in longitudinal direction D33 of vibrator 33 and also stretches in longitudinal direction D43 of vibrator 43 by the length corresponding to the Poisson ratio of side surface 22b of housing 22. This action decreases the difference between the vibration frequencies of vibrators 33 and 43 of strain detector 25a (25b), namely, decreases a difference (fa−fb) to a difference (fa−fb)−(fa1+fb1) by a difference (fa1+fb1). Vibrators 33 and 43 of strain detector 25a (25b) generate electric signals which are processed by processing circuit 24a mounted on board 24, thereby obtaining an electric signal (e.g. a voltage signal) that corresponds to the increase and decrease of the difference between the frequencies of those two AC signals changed by compressive load F applied to housing 22. According to Embodiment 1, processing circuit 24a of information apparatus 21 outputs a voltage signal in response to a change in the vibration frequency; however, circuit 24a can detect the change in the vibration frequency of oscillators 32 and 42, thereby detecting compressive load F applied to housing 22.

Processing circuit 24a executes plural functions of information apparatus 21, and controls at least one of plural functions P1 to P3, described below, in response to a signal output from strain detector 25a (25b).

Function P1: Compressive load F is applied continuously to side surface 22b of housing 22 to cause processing circuit 24a to scroll a display on display screen 23 in a forward direction or a reverse direction in response to a way of applying compressive load F. A change in compressive load F changes a scrolling speed.

Function P2: Back surface 22d of housing 22 is tapped at a predetermined rhythm for applying pulse-like compressive load F as to cause processing circuit 24a to change a volume of sound output from audio output section 24b.

Function P3: Compressive load F is applied to side surfaces 22b and 22c of housing 22 at a predetermined rhythm to cause processing circuit 24a to connect to the Internet.

As discussed above, in information apparatus 21 in accordance with Embodiment 1, compressive load F applied to side surface 22b of housing 22 causes processing circuit 24a to control at least one of functions P1 to P3 in response to an electric signal generated by strain detector 25a (25b). This control allows a user to control, with a single hand, a variety of functions of information apparatus 21, such as a display function, communication function, and a game machine function, so that the user can execute various input operations easily. This can eliminate a space in information apparatus 21 for providing an input device, such as touch pad, on a surface, such as front surface 22a and side surfaces 22b and 22c of housing 22, so that information apparatus 22 can provide display screen 23 on front surface 22a with a large size while having a small size.

In information apparatus 21 in accordance with Embodiment 1, two strain detectors 25a and 25b are disposed in housing 22, as shown in FIG. 1A. Processing circuit 24a measures absolute values of outputs from strain detectors 25a and 25b, and thereby, reduces electrical disturbance, such as electrostatic, accordingly improving detection accuracies of strain detectors 25a and 25b. To be more specific, processing circuit 24a calculates an absolute value V of a difference between output V1 from strain detector 25a and output V2 from strain detector 25b.

Figure 3:
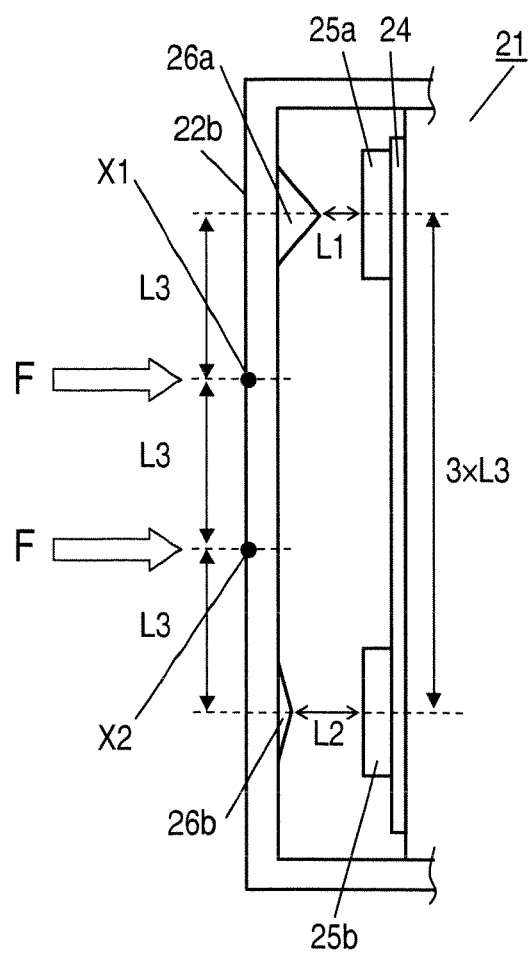
FIG. 3 is an enlarged view of the information apparatus in accordance with Embodiment 1.

A method of determining a position at which compressive load F is applied to housing 22 of information apparatus 21 in accordance with Embodiment 1 will be described below. FIG. 3 is an enlarged view of information apparatus 21. As shown in FIG. 3, compressive load F is applied to positions X1 and X2 on side surface 22b. Distance from strain detector 25a to strain detector 25b is 3×L3. Position X1 is located away from strain detector 25a toward strain detector 25b by distance L3, and away from strain detector 25b toward strain detector 25a by distance 2×L3. Position X2 is away from strain detector 25a toward strain detector 25b by distance 2×L3, and away from strain detector 25b toward strain detector 25a by distance L3.

Figure 4A:
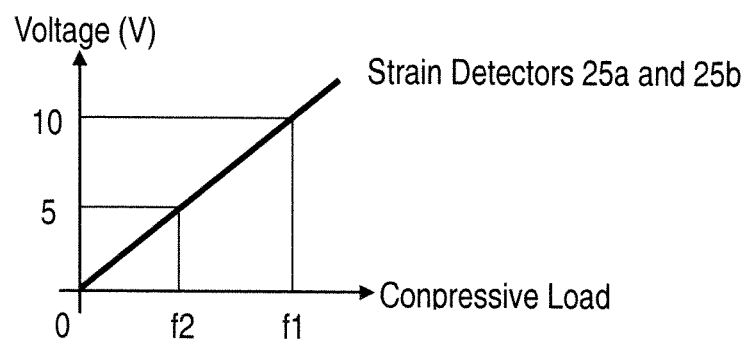
FIG. 4A shows output characteristics of the strain detector of the information apparatus in accordance with Embodiment 1.
Figure 4B:
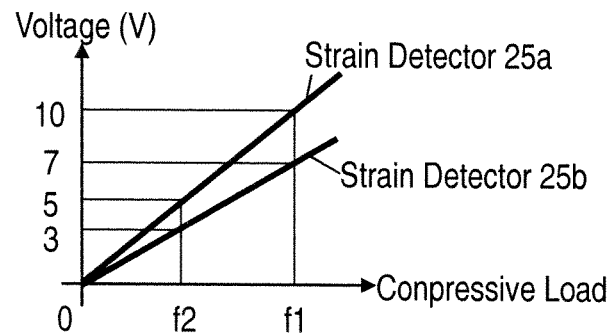
FIG. 4B shows output characteristics of the strain detector of the information apparatus in accordance with Embodiment 1.

FIG. 4A shows output voltages from strain detectors 25a and 25b when compressive load F is applied at positions X1 and X2 on side surface 22b of housing 22 of a comparative example of an information apparatus. FIG. 4B shows output voltages from strain detectors 25a and 25b when compressive load F is applied to positions X1 and X2 on side surface 22b of housing 22 of information apparatus 21 in accordance with Embodiment 1. In each of FIGS. 4A and 4B, the horizontal axis represents magnitudes of compressive load, and the vertical axis represents output voltages from the strain detectors. The comparative example of the information apparatus is different from information apparatus 21 in that distance L1 is equal to distance L2. In other words, the comparative example of the information apparatus outputs signals equal to each other in response to distortions equal to each other applied to side surface 22b. The comparative example of the information apparatus is different from information apparatus 21 in the above configuration. A stress collector, out of stress collectors 26a and 26b which is located at distance L3 from the position at which compressive load F is applied receives compressive load f1 while the other stress collector located at distance 2×L3 from the position at which compressive load F is applied receives compressive load f2. For instance, when compressive load F is applied at position X1, stress collector 26a receives load f1 while strain collector 26b receives load f2 simultaneously. When compressive load F is applied to position X2, stress collector 26a receives load f2 while strain collector 26b receives load f1 simultaneously. FIG. 4A shows the output voltage from strain detector 25b in response to compressive load F applied to the comparative example of the information apparatus in which stress collectors 26a and 26b have the same length in the thickness direction, and distance L1 is equal to distance L2. The comparative example of the information apparatus is different from information apparatus 21 in accordance with Embodiment 1 in distance L1 is equal to distance L2. In information apparatus 21 in accordance with Embodiment 1, stress collectors 26a and 26b have different lengths in the thickness direction, and distance L1 is different from distance L2, namely, distance L1 is smaller than distance L2. Since the comparative example of the information apparatus has distance L1 equal to distance L2, compressive load F applied to side surface 22b causes strain detectors 25a and 25b to receive the same force, and causes strain detectors 25a and 25b to exhibit the same output characteristics, as shown in FIG. 4A. On the other hand, in information apparatus 21 in accordance with Embodiment 1, distance L1 is smaller than distance L2, and an amount of distortion transmitted to strain detector 25a is larger than that transmitted to strain detector 25b, hence causing strain detectors 25a and 25b of information apparatus 21 to have different output characteristics from each other, as shown in FIG. 4B.

In the comparative example of the information apparatus in which distances L1 and L2 are equal to each other, when compressive load F is applied to position X1, output voltages V1 and V2 from strain detectors 25a and 25b are 10V and 5V, respectively, and an absolute value of the difference between output voltages V1 and V2 is 5V, as shown in FIG. 4A. When compressive load F is applied to position X2, output voltages V1 and V2 from strain detectors 25a and 25b are 5V and 10V, respectively, and an absolute value of the difference between output voltages V1 and V2 is 5V, as shown in FIG. 4A. Regardless of positions X1 or X2 where compressive load F is applied, the absolute value of the difference between output voltages V1 and V2 from strain detectors 25a and 25b does not change, so that it cannot be determined which one of positions X1 and X2 compressive load F is applied to.

In the information apparatus 21 in which distance L1 is different from distance L2 and is smaller than distance L2, when compressive load F is applied at position X1, output voltages V1 and V2 from strain detectors 25a and 25b are 10V and 3V, respectively, and an absolute value of the difference between output voltages V1 and V2 is 7V, as shown in FIG. 4B. When compressive load F is applied at position X2, output voltages V1 and V2 from strain detectors 25a and 25b are 3V and 10V, respectively, and an absolute value of the difference between output voltages V1 and V2 is 2V, as shown in FIG. 4B. The absolute values of the difference between output voltages V1 and V2 from strain detectors 25a and 25b are different from each other depending on positions X1 and X2 where compressive load F is applied. Processing circuit 24a thus can determine which position on side surface 22b of housing 22 compressive load F is applied to.

As discussed above, strain detectors 25a and 25b allows the processing circuit 24a to determine which position on side surface 22b the compressive load is applied to. Information apparatus 21 thus can decrease the size of the places where strain detectors 25a and 25b are disposed, so that a space in housing 22 can be used efficiently. For instance, a user of information apparatus 21 applies compressive load F onto side surface 22b with a finger and slides the finger from strain detector 25a toward strain detector 25b, and then, processing circuit 24a can accurately identify a position of the finger. Processing circuit 24a thus can execute more sophisticated controls.

Figure 21:
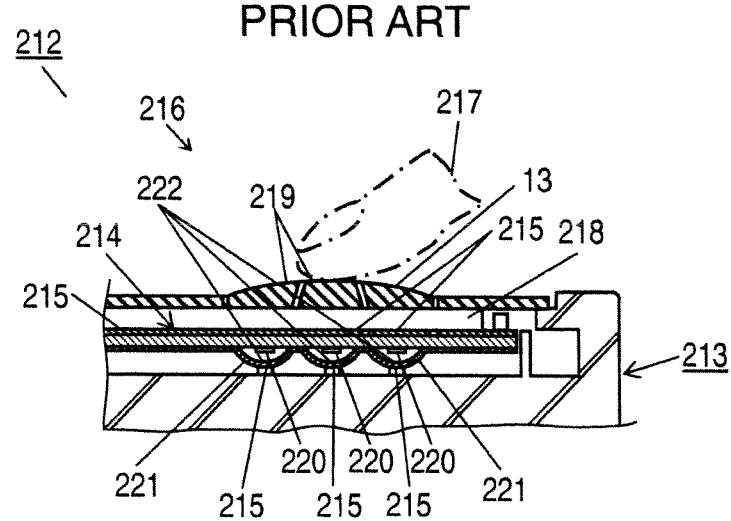
FIG. 21 is an enlarged view of still another conventional information apparatus.

Conventional input device 212 shown in FIG. 21 includes not less than two sensor sheets 215 to detect positional information for accurately detecting a sliding position, so that device 212 has a large size. If the number of sensor sheets 215 is reduced in order to provide the input device 212 with a small size, the sliding position cannot be detected easily. The conventional information apparatus (i.e. input device 212) thus has a difficulty to have a small size and detecting accurately the sliding position, so that the information apparatus cannot control the functions accurately.

In the information apparatus 21 shown in FIG. 1A in accordance with Embodiment 1, the lengths in a thickness direction of stress collectors 26a and 26b, in other words, the lengths of stress collectors 26a and 26b along the direction toward strain detectors 25a and 25b are different from each other, so that distances L1 and L2 from stress collectors 26a and 26b to strain detectors 25a and 25b can be different from each other. Instead of this structure, strain detectors 25a and 25b may have different thicknesses from each other, so that distances L1 and L2 can be different from each other, or instead of this structure, board 24 can be disposed slantingly with respect to side surface 22b, so that distances L1 and L2 can be different from each other.

In the information apparatus 21 in accordance with Embodiment 1, stress collectors 26a and 26b are disposed on side surface 22b; however, stress collectors 26a and 26b can be disposed on side surface 22c, back surface 22d, or front face 22a as long as stress collectors 26a and 26b face strain detectors 25a and 25b respectively.

Information apparatus 21 includes two stress collectors 26a and 26b and two strain detectors 25a and 25b; however, Information apparatus 21 may include more than two stress collectors and more than two strain detectors facing the stress collectors, respectively. In this case, if at least two of these strain detectors output different values with respect to the same distortion amount, an advantage similar to the information apparatus 21 is obtainable. If more than two strain detectors output values different from each other with respect to the same distortion amount, the position at which load is applied can be detected more accurately.

Stress collectors 26a and 26b may connect board 24 to side surface 22b mechanically. This structure can eliminate a process for mounting the board 24 having strain detectors 25a and 25b mounted thereon directly to housing 22 of information apparatus 21, so that a degree of freedom in designing information apparatus 21 can be increased. Since board 24 is connected mechanically to an inner surface of housing 22 via stress collectors 26a and 26b, even when smaller compressive load is applied to a surface of housing 22 of apparatus 21, the distortion can be transmitted efficiently via stress collectors 26a and 26b to strain detectors 25a and 25b. As a result, strain detectors 25a and 25b can generate signals large enough. Strain detectors 25a and 25b can be disposed at different positions in a vertical direction of FIG. 1A, namely in a height direction of information apparatus 21. This structure also allows strain detectors 25a and 25b to output different values from each other with respect to the same distortion amount, so that a similar advantage is obtainable. More than two strain detectors allow information apparatus 21 to detect accurately a position onto side surface 22b to which compressive load F is applied.

Exemplary Embodiment 2

Figure 5:
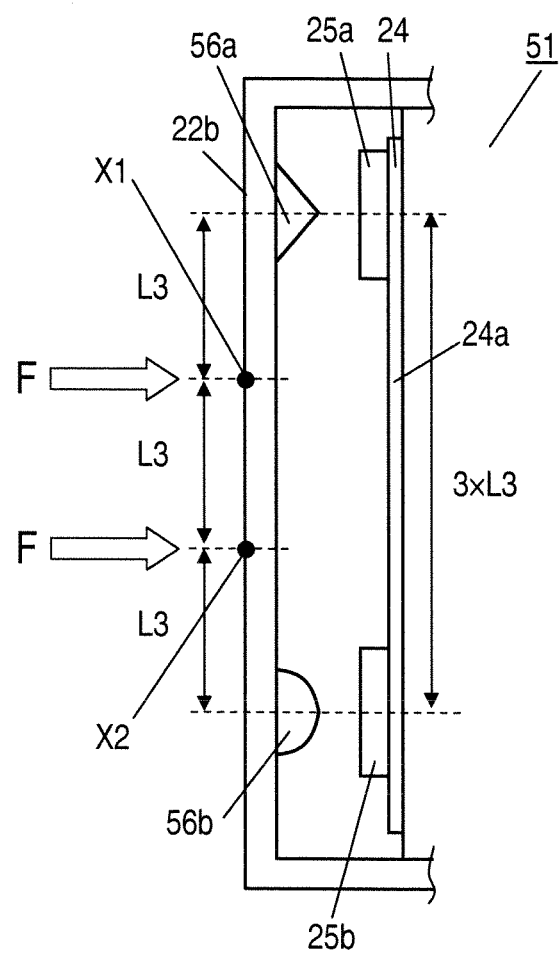
FIG. 5 is an enlarged view of an information apparatus in accordance with Exemplary Embodiment 2 of the present invention.

FIG. 5 is a sectional enlarged view of information apparatus 51 in accordance with Exemplary Embodiment 2. In FIG. 5, components identical to those of information apparatus 21 shown in FIGS. 1A to 4B in accordance with Embodiment 1 are denoted by the same reference numerals. Information apparatus 51 in accordance with Embodiment 2 includes stress collectors 56a and 56b instead of stress collectors 26a and 26b according to Embodiment 1. Stress collectors 56a and 56b have different shapes and disposed on side surface 22b of housing 22 such that stress collectors 56a and 56b face strain detectors 25a and 25b, respectively.

Stress collector 56a has a conical shape while stress collector 56b has a hemispheric shape. Stress collector 56a thus has a sharper tip than stress collector 56b. When a user depresses side surface 22b with a finger to apply compressive load F onto side surface 22b, stress collector 56a transmits a larger amount of distortion to strain detector 25a than an amount of distortion transmitted by stress collector 56b to strain detector 25b. In information apparatus 51 in accordance with Embodiment 2, distance L1 from stress collector 56a to strain detector 25a may be equal to distance L2 from stress collector 56b to strain detector 25b. The different shapes of stress collectors 56a and 56b allow stress collectors 56a and 56b to transmit different amounts of distortions to strain detectors 25a and 25b even if distance L1 is equal to distance L2. Processing circuit 24a thus can accurately detect a position on side surface 22b at which compressive load F is applied.

Information apparatus 51 in accordance with Embodiment 2 includes stress collector 56a and 56b having conical and hemispheric shapes, respectively. Stress collector 56a and 56b may have, for instance, cylindrical and cuboid shapes, respectively, and provide similar effects as long as stress collector 56a and 56b have different shapes.

Exemplary Embodiment 3

Figure 6:
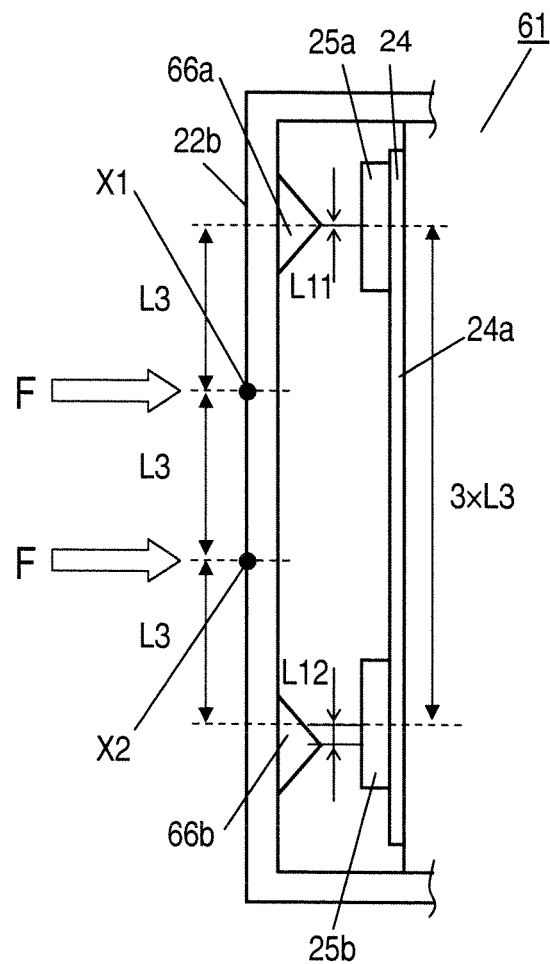
FIG. 6 is an enlarged view of an information apparatus in accordance with Exemplary Embodiment 3 of the present invention.

FIG. 6 is an enlarged view of information apparatus 61 in accordance with Exemplary Embodiment 3. In FIG. 6, components identical to those of information apparatus 21 shown in FIGS. 1A to 4B in accordance with Embodiment 1 are denoted by the same reference numerals. Information apparatus 61 in accordance with Embodiment 3 includes stress collectors 66a and 66b instead of stress collectors 26a and 26b according to Embodiment 1. Stress collectors 66a and 66b are disposed on side surface 22b of housing 22 such that stress collectors 66a and 66b face strain detectors 25a and 25b, respectively. In this information apparatus 61 in accordance with Embodiment 3, along a direction parallel with side surface 22b, distance L11 from a center of strain detector 25a to a center of stress collector 66a is different from distance L12 from a center of strain detector 25b to a center of stress collector 66b.

In information apparatus 61 shown in FIG. 6, the center of strain detector 25a agrees with the center of stress collector 66a on the normal line of side surface 22b; however, stress collector 66b is placed such that the center of strain collector 66b deviates from the center of strain detector 25b along the direction parallel with side surface 22b.

Figure 7:
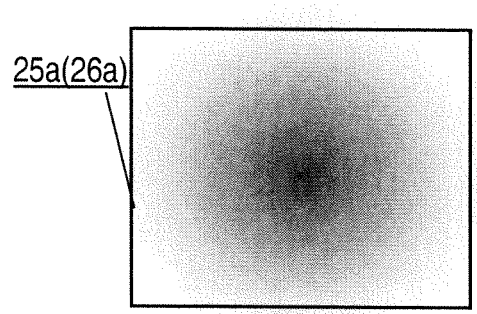
FIG. 7 shows sensitivity characteristics of a strain detector of the information apparatus in accordance with Embodiment 3.

FIG. 7 shows sensitivity characteristics of strain detectors 25a and 25b. In FIG. 7, a denser area represents a higher detecting sensitivity to a distortion. As shown in FIG. 7, strain detectors 25a and 25b detect the distortion at their centers with the highest sensitivity, and the sensitivity decreases as a position away from the center like concentric circles. When a user presses side surface 22b with a finger to apply compressive load F onto side surface 22b, the above structure allows distance L11 to be different from distance L12, as shown in FIG. 6. Distance L11 is an interval from the center of strain detector 25a to a point where stress collector 66a contacts strain detector 25a. Distance L12 is an interval from the center of strain detector 25b to a point where stress collector 66b contacts strain detector 25b. A difference between outputs from strain detectors 25a and 25b thus cannot be the same at least at two different positions, so that processing circuit 24a can accurately detect the position at which the compressive load is applied.

Exemplary Embodiment 4

Figure 8:
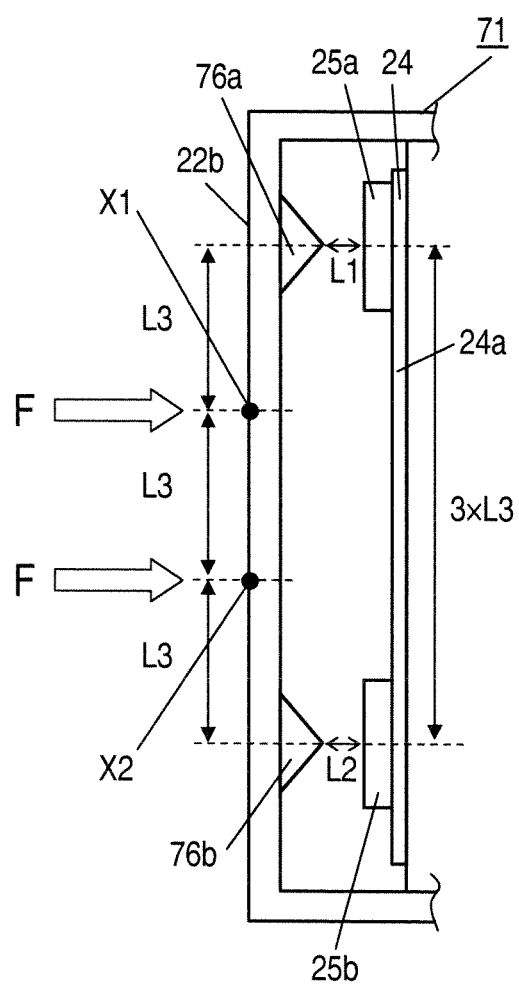
FIG. 8 is an enlarged view of an information apparatus in accordance with Exemplary Embodiment 4 of the present invention.

FIG. 8 is an enlarged view of information apparatus 71 in accordance with Exemplary Embodiment 4. In FIG. 8, components identical to those of information apparatus 21 shown in FIGS. 1A to 4B in accordance with Embodiment 1 are denoted by the same reference numerals. Information apparatus 71 in accordance with Embodiment 4 includes stress collectors 76a and 76b instead of stress collectors 26a and 26b according to Embodiment 1. Stress collectors 76a and 76b are disposed on side surface 22b of housing 22 such that stress collectors 76a and 76b face strain detectors 25a and 25b, respectively.

Information apparatus 71 in accordance with Embodiment 4 includes stress collectors 76a and 76b having thicknesses equal to each other. Distance L1 from stress collector 76a to strain detector 25a is equal to distance L2 from stress collector 76b to strain detector 25b. Stress collector 76a is made of, for instance, resin such as polycarbonate while stress collector 76b is made of metal, such as aluminum. In other words, stress collectors 76a and 76b are made of different materials.

According to Embodiment 4, stress collector 76a is made of material having smaller rigidity than that of material of stress collector 76b, so that an amount of distortion transmitted from stress collector 76a to strain detector 25a is smaller than an amount of distortion transmitted from stress collector 76b to strain detector 25b. This structure allows a difference in outputs from strain detectors 25a and 25b to be different from each other at least at two different positions. Processing circuit 24a thus can detect more accurately a position on side surface 22b to which the compressive load is applied.

According to Embodiment 4, stress collector 76a is made of resin, such as polycarbonate, and stress collector 76b is made of metal, such as aluminum; however, stress collectors 76a and 76b may be made of materials having different rigidities, for instance, a resin material and a metal material having different rigidities, providing similar effects.

Exemplary Embodiment 5

Figure 9:
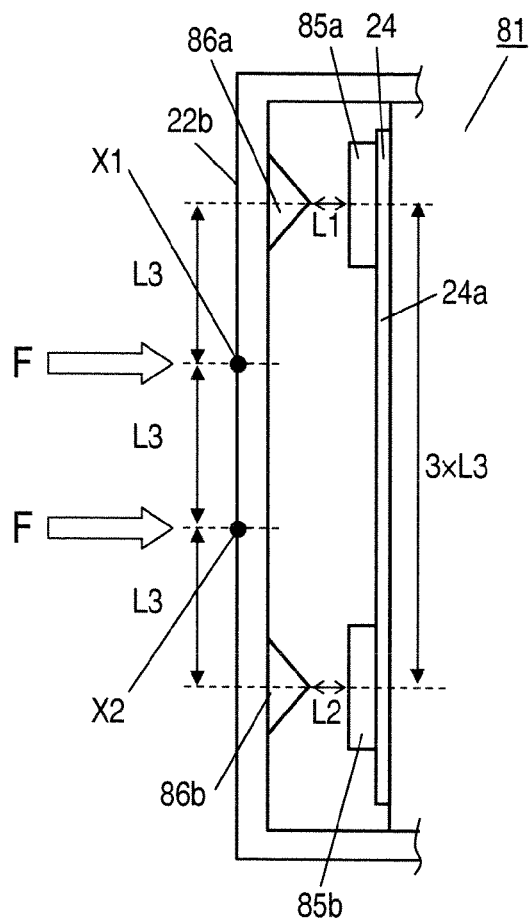
FIG. 9 is an enlarged view of an information apparatus in accordance with Exemplary Embodiment 5 of the present invention.

FIG. 9 is an enlarged view of information apparatus 81 in accordance with Exemplary Embodiment 5. In FIG. 9, components identical to those of information apparatus 21 shown in FIGS. 1A to 4B in accordance with Embodiment 1 are denoted by the same reference numerals. Information apparatus 81 in accordance with Embodiment 5 includes strain detectors 85a and 85b and stress collectors 86a and 86b instead of strain detectors 25a and 25b and stress collectors 76a and 76b of information apparatus 71 in accordance with Embodiment 4. Stress collector 86a and 86b are disposed on side surface 22b of housing 22 and face strain detectors 85a and 85b that are mounted on board 24, respectively, similarly to strain detectors 25a and 25b and stress collectors 76a and 76b of information apparatus 71 in accordance with Embodiment 4.

In the information apparatus 81 in accordance with Embodiment 5, distance L1 from strain detector 85a to stress collector 86a is equal to distance L2 from strain detector 85b to stress collector 86b. Strain detectors 85a and 85b of information apparatus 81 have different output characteristics of distortion from each other, and stress collectors 86a and 86b are made of the same material and thus have rigidities equal to each other.

Figure 10:
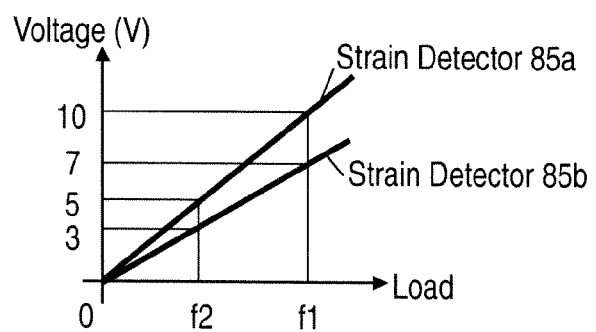
FIG. 10 shows output characteristics of a strain detector of the information apparatus in accordance with Embodiment 5.

FIG. 10 shows the output characteristics of strain detectors 85a and 85b of information apparatus 81 in accordance with Embodiment 5. As shown in FIG. 10, when the same amount of distortion is applied, strain detector 85a outputs a larger value than strain detector 85b.

For instance, strain detector 85a includes vibrators 33 and 43 with beam shapes having natural frequencies fa and fb, respectively, similarly to strain detector 25a according to Embodiments 1 to 4, so that strain detector 85a has the same output characteristics as strain detector 25a. Strain detector 85b includes vibrators 33 and 43 with beam shapes having natural frequencies fa and fc, respectively. Natural frequency fc is different from natural frequency fb, so that strain detector 85b has output characteristics different from that of strain detector 85a.

While vibrators 33 and 43 with the beam shapes of oscillators 32 and 42 of n strain detector 85b perform string vibration, load F is applied to side surface 22b of housing 22 in parallel with longitudinal direction D33 of the beam shape of vibrator 33, then vibrator 33 of strain detector 85b stretches in longitudinal direction 33D, and vibrator 43 shrinks in longitudinal direction D43 of the beam shape of vibrator 43 by a length corresponding to the Poisson ratio of side surface 22b of housing 22. Vibrator 33 thus receives a stretching force, so that a vibrating frequency of vibrator 33 increases from a frequency fa to a frequency (fa+fa1) while a vibrating frequency of vibrator 43 decreases from a frequency fc to a frequency (fc−fc1). Processing circuit 24a thus detects a difference between the vibrating frequencies of vibrators 33 and 43, and measures the load acting on lateral force 22b of housing 22 with high sensitivity.

The above configuration allows strain detectors 85a and 85b to output different values from each other when compressive load F is applied to side surface 22b. The difference in outputs from strain detectors 85a and 85b cannot be the same at least at two different positions, so that processing circuit 24a can accurately detect the position at which the compressive load is applied.

Exemplary Embodiment 6

Figure 11:
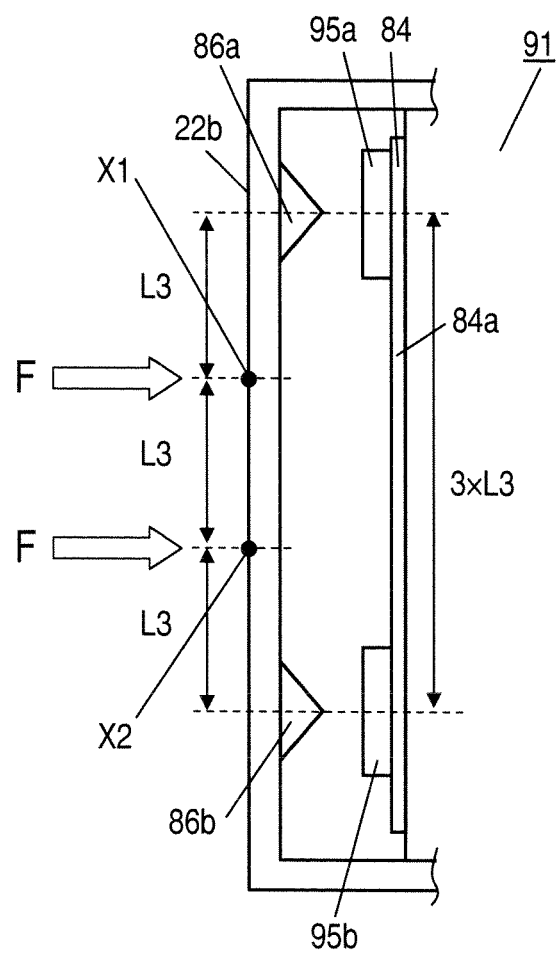
FIG. 11 is an enlarged view of an information apparatus in accordance with Exemplary Embodiment 6 of the present invention.

FIG. 11 is an enlarged view of information apparatus 91 in accordance with Embodiment 6. In FIG. 11, components identical to those of information apparatus 81 in accordance with Embodiment 5 are denoted by the same reference numerals. Information apparatus 91 in accordance with Embodiment 6 includes strain detectors 95a and 95b and processing circuit 84a instead of strain detectors 85a and 85b and processing circuit 24a according to Embodiment 5.

In information apparatus 91 in accordance with Embodiment 6, strain detectors 95a and 95b are electrically connected to processing circuit 84a having a microprocessor which controls timing of the outputs from strain detectors 95a and 95b. To be more specific, the microprocessor controls strain detector 95b to delay its output by a predetermined time (10 ms according to Embodiment 6) from an output of strain detector 95a. In other words, a duration from a time when strain detector 95a receives distortion to a time when strain detector 95a outputs a signal to processing circuit 84a is different from a duration from a time when strain detector 95b receives distortion to a time when strain detector 95b outputs of a signal to processing circuit 84a. Strain detectors 95a and 95b output the same value with respect to the amounts of distortion applied to strain detectors 95a and 95b.

Figure 12A:
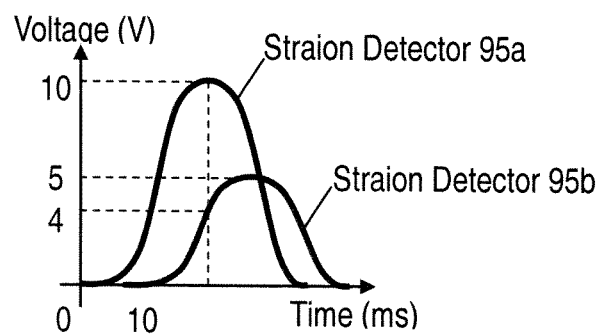
FIG. 12A shows an output from a strain detector of the information apparatus in accordance with Embodiment 6.
Figure 12B:
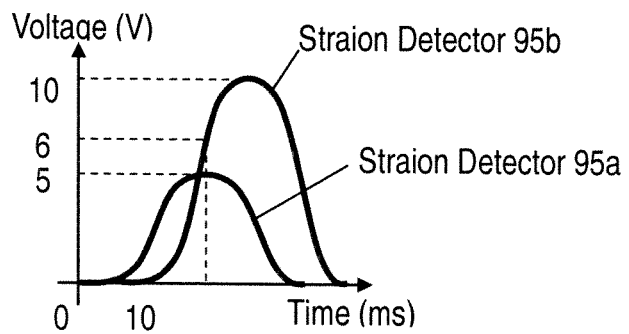
FIG. 12B shows an output from the strain detector of the information apparatus in accordance with Embodiment 6.

FIG. 12A shows output voltages V1 and V2 from strain detectors 95a and 95b, respectively, when compressive load F is applied to position X1 shown in FIG. 11. FIG. 12B shows output voltages V1 and V2 from strain detectors 95a and 95b, respectively, when compressive load F is applied to position X2 shown in FIG. 11. In each of FIGS. 12A and 12B, the horizontal axis represents time and the vertical axis represents voltages output from strain detectors 95a and 95b. When compressive load F is applied to position X1, strain detector 95a outputs 10V, and strain detector 95b outputs 5V; however, as shown in FIG. 12A, the output from strain detector 95b delays by 10 ms from the voltage output from strain detector 95a. As a result, when strain detector 95a outputs output voltage V1 (i.e. 10V) to processing circuit 84a, output voltage V2 from strain detector 95b rises to 4V, so that an absolute difference value between output voltages V1 and V2 from strain detectors 95a and 95b becomes 6V. On the other hand, when compressive load F is applied to position X2, strain detector 95a outputs 5V, and strain detector 95b outputs 10V; however, as shown in FIG. 12B, the output from strain detector 95b delays by 10 ms from the voltage output from strain detector 95a. As a result, when strain detector 95a outputs output voltage V1 (i.e. 5V) to processing circuit 84a, voltage V2 output from strain detector 95b rises to 6V, so that an absolute difference value between output voltages V1 and V2 from strain detectors 95a and 95b becomes 1V. As discussed above, the delay of voltage V2 output by strain detector 95b to processing circuit 84a from voltage V1 output by strain detector 95a to processing circuit 84a allows an absolute difference value between output voltages V1 and V2 from strain detectors 95a and 95b to be different from each other when the same compressive load F is applied to positions X1 and X2. Processing circuit 84a thus can accurately determine a position on side surface 22b at which compressive load F is applied between stress collectors 86a and 86b.

In this information apparatus 91 in accordance with Embodiment 6, an output of strain detector 95b delays by 10 ms from an output of strain detector 95a; however, the delay time is not limited to 10 ms. For instance the output of strain detector 95a can delay by a predetermined time from the output of strain detector 95b, providing similar effects.

Exemplary Embodiment 7

Figure 13A:
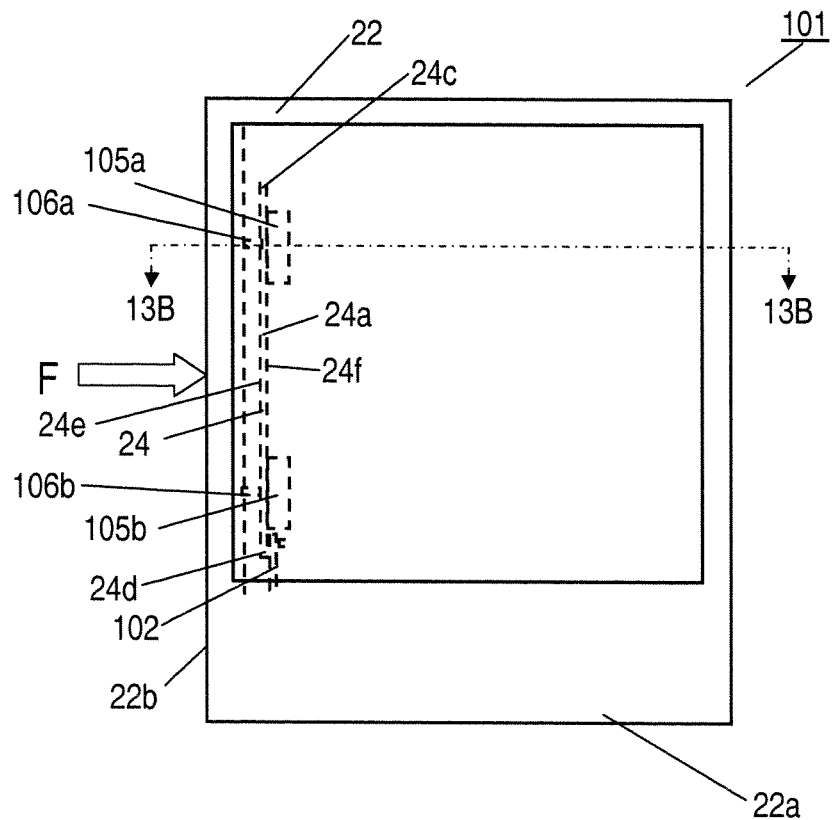
FIG. 13A is a plan view of an information apparatus in accordance with Exemplary Embodiment 7 of the present invention.
Figure 13B:
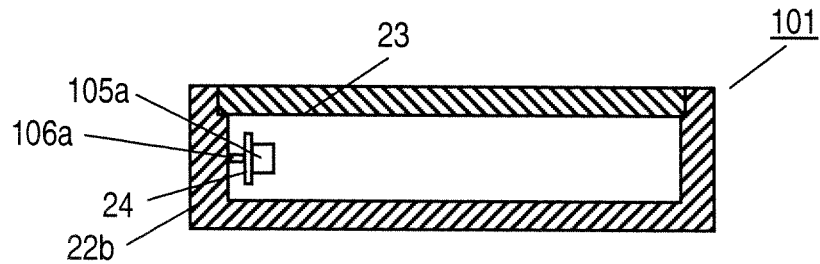
FIG. 13B is a sectional view of the information apparatus at line 13B-13B shown in FIG. 13A.

FIG. 13A is a plan view of information apparatus 101 in accordance with Exemplary Embodiment 7 of the present invention. FIG. 13B is a sectional view of information apparatus 101 at line 13B-13B shown in FIG. 13A. In FIGS. 13A and 13B, components identical to those of information apparatus 21 in accordance with Embodiment 1 shown in FIGS. 1 and 2 and information apparatus 91 in accordance with Embodiment 6 shown in FIG. 11 are denoted by the same reference numerals. Information apparatus 101 includes strain detectors 105a and 105b and stress collectors 106a and 106b instead of strain detectors 95a and 95b and stress collectors 96a and 96b. Information apparatus 101 further includes inner chassis 102 for supporting board 24 and coupling board 24 to housing 22.

Strain detectors 105a, 105b are disposed on surface 24f of board 24 opposite to surface 24e facing side surface 22b. Stress collector 106a and 106b warp board 24 due to the stress applied to side surface 22b of housing 22. Strain detectors 105a and 105b detect this warp of board 24. Stress collectors 106a and 106b transmit the warp of side surface 22b to strain detectors 105a and 105b, respectively, via board 24.

Inner chassis 102 supports board 24 only at an end of board 24. In other words, board 24 has end 24d and end s4c opposite to end 24d. End 24d is supported by inner chassis 102 and coupled to housing 22. End 24c is not coupled to housing 22. Strain detectors 105a and 105b output the same value with respect to a distortion amount applied thereto. Processing circuit 24a does not control timing of the outputs from strain detectors 105a and 105b. A difference of heat expansion coefficients of inner chassis 102 and board 24 causes heat stress to act on board 24; however, this heat stress does not cause strain detectors 105a and 105b to generate output signals. Processing circuit 24a thus can accurately detect the compressive load applied to the surface of housing 22.

Since board 24 is supported only at end 24d and strain detector 105b is closer to inner chassis 102 than strain detector 105a, amounts of distortion transmitted from stress collectors 106a and 106b to strain detectors 105a and 105b in response to an equal compressive load F applied to stress collectors 106a and 106b are different from each other. As a result, processing circuit 24a can accurately determine a position on side surface 22b at which compressive load F is applied.

Exemplary Embodiment 8

Figure 14A:
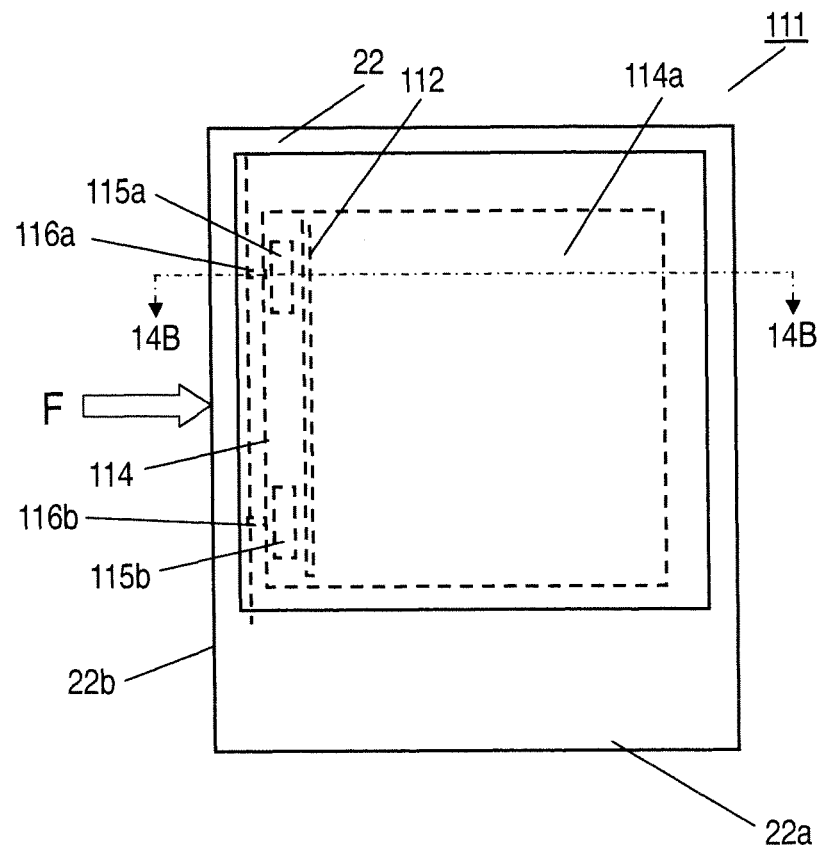
FIG. 14A is a plan view of an information apparatus in accordance with Exemplary Embodiment 8 of the present invention.
Figure 14B:
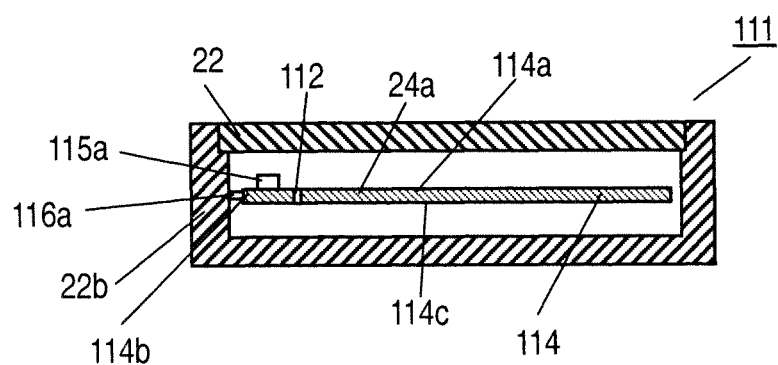
FIG. 14B is a sectional view of the information apparatus at line 14B-14B shown in FIG. 14A.

FIG. 14A is a plan view of information apparatus 111 in accordance with Exemplary Embodiment 8 of the present invention. FIG. 14B is a sectional view of information apparatus 111 at line 14B-14B shown in FIG. 14A. In FIGS. 14A and 14B, components identical to those of information apparatus 101 in accordance with Embodiment 7 are denoted by the same reference numerals. Information apparatus 111 includes strain detectors 115a and 115b, stress collectors 116a and 116b, and board 114 instead of strain detectors 105a and 105b, stress collectors 106a and 106b, and board 24.

Board 114 extends substantially perpendicularly to side surface 22b of housing 22. To be more specific, board 114 has main surface 114a extending perpendicularly to side surface 22b, back surface 114c opposite to main surface 114a, side edge surfaces 114b disposed between main surface 114a and back surface 114c and connected to main surface 114a and back surface 114c. Board 114 has slit 112 therein penetrating from main surface 114a to back surface 114c and extending substantially in parallel with side edge surface 114b. Strain detectors 115a and 115b are disposed on main surface 114a and between side edge surface 114b and slit 112. Load F applied to side surface 22b of housing 22 causes stress collectors 116a and 116b to push side edge surface 114b of board 114, so that a portion of board 114 between side edge surface 114b and slit 112 bends in a direction parallel to main surface 114a (back surface 114c). Strain detectors 115a and 115b disposed at this portion of board 114 detect the bending. In other words, stress collectors 116a and 116b transmit a distortion of side surface 22b of housing 22 to strain detectors 115a and 115b, respectively, via this portion of board 114. This structure allows board 114 having strain detectors 115a and 115b mounted thereon to bend easily, so that compressive load F having a small amount applied to side surface 22b of housing 22 can cause strain detectors 115a, 115b to generate signals large enough upon receiving a distortion transmitted by stress collectors 116a and 116b. As a result, processing circuit 24a can accurately detect the position on side surface 22b at which load F is applied to, and can control functions of information apparatus 111 precisely.

Exemplary Embodiment 9

Figure 15:
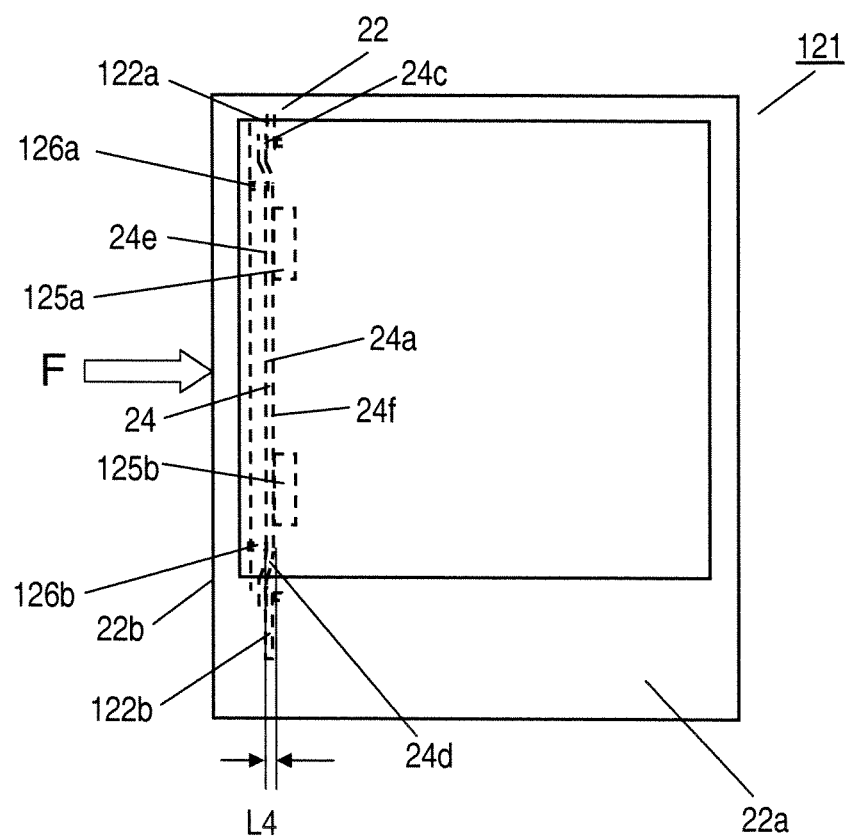
FIG. 15 is a plan view of an information apparatus in accordance with Exemplary Embodiment 9 of the present invention.

FIG. 15 is an enlarged view of information apparatus 121 in accordance with Exemplary Embodiment 9 of the present invention. In FIG. 15, components identical to those of information apparatus 101 in accordance with Embodiment 7 shown in FIGS. 13A and 13B are denoted by the same reference numerals. Information apparatus 121 includes stress collectors 126a and 126b and inner chassis 122a and 122b instead of stress collectors 106a and 106b and instead of inner chassis 102.

Information apparatus 121 in accordance with Embodiment 9 includes board 24 having ends 24c and 24d supported by inner chasses 112a and 122b, respectively, at a printed circuit board and are coupled to housing 22. Stress collectors 126a and 126b contact surface 24e of board 24. Strain detectors 125a and 125b are disposed on surface 24f of board 24 opposite to surface 24e where stress collectors 126a and 126b are not placed. Stress collectors 126a and 126b transmit distortions of side surface 22b via board 24 to strain detectors 125a and 125b, respectively.

Stress collector 126a contacts surface 24e of board 24 between strain detector 125a and inner chassis 122a (end 24c of board 24). Stress collector 126b contacts surface 24e of board 24 between strain detector 125b and inner chassis 122b (end 24d of board 24). As shown in FIG. 15, board 24 is urged by stress collectors 126a and 126b, and thus mounted to housing 22 with a bias of distance L4. This biased mounting allows board 24 to securely contact stress collectors 126a and 126b, so that a distortion applied to side surface 22b can be transmitted reliably by stress collectors 126a and 126b to strain detectors 125a and 125b. This structure eliminates a gap which may be produced due to variations in manufacturing processes between board 24 and each of stress collectors 126a and 126b. The distortion can be transmitted by stress collectors 126a and 126b securely to strain detectors 125a and 125b although variation in manufacturing processes affect the structure. As a result, the productivity of information apparatus 121 can be improved.

Figure 16A:
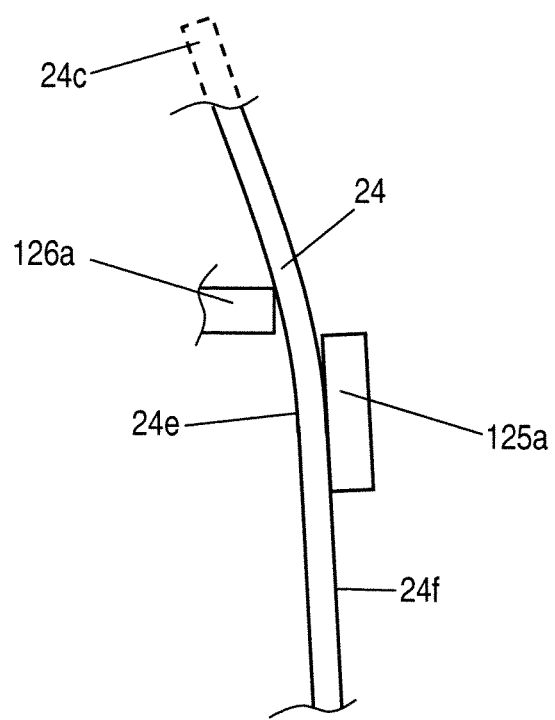
FIG. 16A is an enlarged view of the information apparatus in accordance with Embodiment 9.

FIG. 16A is an enlarged view of information apparatus 121 in accordance with Embodiment 9, and illustrates a distortion transmitted from stress collector 126a to strain detector 125a. When the distortion is produced on side surface 22b of housing 22, stress collector 126a transmits the distortion to board 24, and changes the shape of board 24. Since stress collector 126a is disposed between strain detector 125a and inner chassis 122a, board 24 bends with the largest curvature at a place where strain detector 125a is disposed. This structure thus allows a larger amount of distortion to be transmitted to strain detector 125a than the structure in which strain detector 125a faces stress collector 126a across board 24. As a result, processing circuit 24a can detect the distortion accurately.

In information apparatus 121 in accordance with Embodiment 9, in a direction along surface 24e (24f) of board 24, a distance from stress collector 126a to strain detector 125a is equal to a distance from stress collector 126b to strain detector 125b. However, even if these distances are different from each other, the same advantage is obtainable.

Figure 16B:
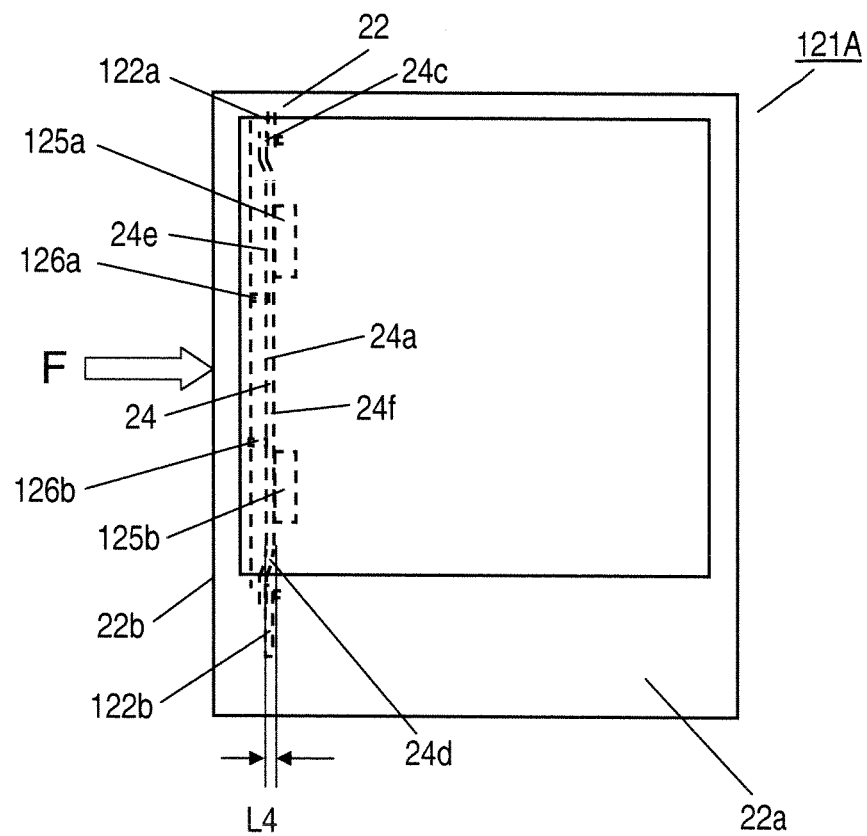
FIG. 16B is a plan view of another information apparatus in accordance with Embodiment 9.

In information apparatus 121 in accordance with Embodiment 9, stress collector 126a contacts board 24 between strain detector 125a and inner chassis 122a while stress collector 126b contacts board 24 between strain detector 125b and inner chassis 122b. FIG. 16B is an enlarged view of another information apparatus 121A in accordance with Embodiment 9. In FIG. 16B, components identical to those of information apparatus 121 shown in FIG. 15 are denoted by the same reference numerals. In information apparatus 121A, stress collectors 126a and 126b contact board 24 between strain detectors 125a and 125b. A distortion is transmitted from stress collectors 126a and 126b to strain detectors 125a and 125b which are disposed on board 24 at a portion bending with the largest curvature. This structure allows processing circuit 24a to accurately detect the distortion, thus providing similar advantages.

Information apparatus 121 in which stress collector 126a contacts board 24 between strain detector 125a and inner chassis 122a as well as stress collector 126b contacts board 24 between strain detector 125b and inner chasses 122b can transmit the stress to strain detectors 125a and 125b more stably regardless of the positions of stress collectors 126a and 126b than information apparatus 121A in which stress collectors 126a and 126b contact board 24 between strain detectors 125a and 125b. As a result, information apparatus 121 does not need a strict accuracy in mounting those components onto board 24, and the productivity of information apparatus 121 can be improved.

Exemplary Embodiment 10

Figure 17:
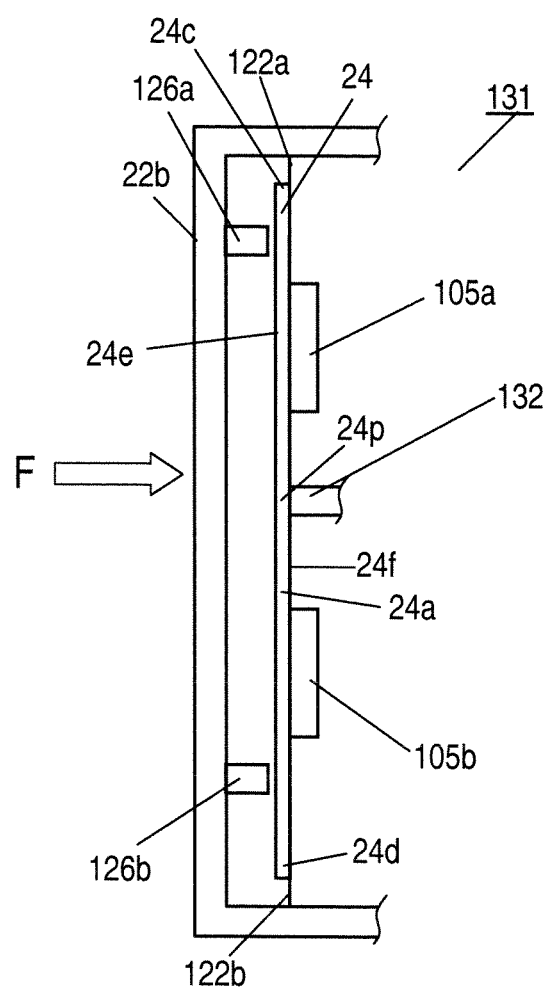
FIG. 17 is an enlarged view of an information apparatus in accordance with Exemplary Embodiment 10 of the present invention.

FIG. 17 is an enlarged view of information apparatus 131 in accordance with Exemplary Embodiment 10 of the present invention. In FIG. 17, components identical to those of information apparatus 121 in accordance with Embodiment 9 shown in FIG. 15 are denoted by the same reference numerals. Information apparatus 131 in accordance with Embodiment 10 further includes inner chassis 132 fixed to a printed circuit board. Board 24 is supported by inner chassis 132 at supported portion 24p at the center of board 24 which is located between strain detectors 125a and 125b. Inner chassis 132 is coupled to housing 22 via the printed circuit board. Board 24 is supported at supported portion 24p with respect to housing 22. End 24d of board 24 is closer to strain detector 125b than strain detector 125a. End 24c is located opposite to end 24d. Stress collector 126a is disposed between strain detector 125a and end 24c of board 24. Stress collector 126b is disposed between strain detector 125b and end 24d of board 24, and contacts board 24.

Board 24 is fixed to housing 22 at ends 24c and 24d with inner chassis 122a and 122b, respectively. Inner chassis 132 contact supported portion 24p between strain detectors 125a and 125b for supporting board 24 so that board 24 cannot bend at supported portion 24p.

Figure 18:
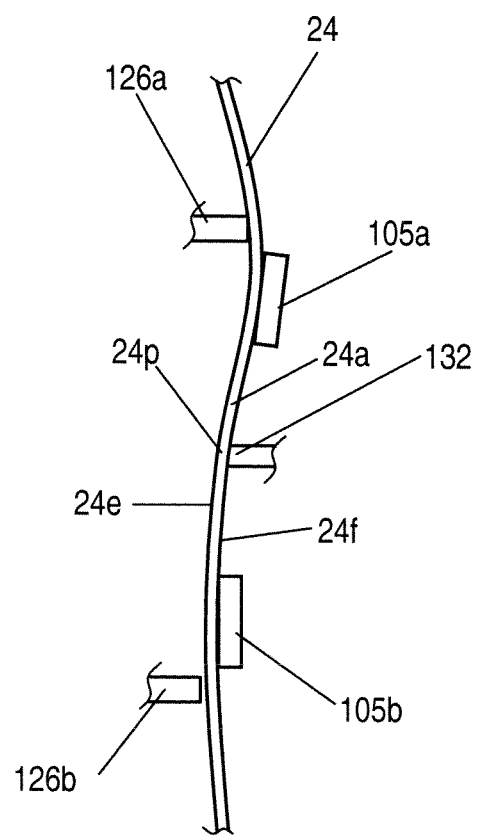
FIG. 18 is an enlarged view of a board of the information apparatus in accordance with Embodiment 10.
Figure 19:
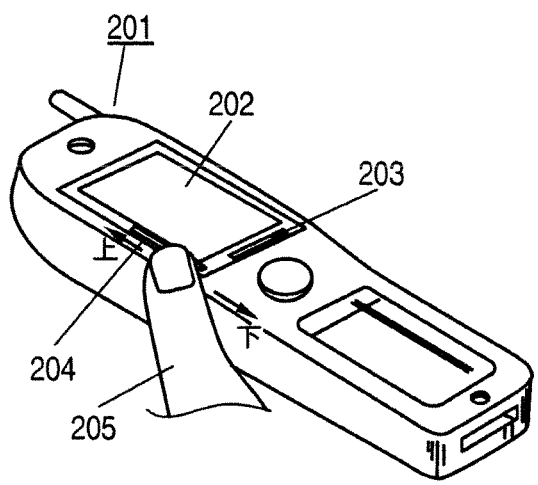
FIG. 19 is a plan view of a conventional information apparatus.
Figure 20:
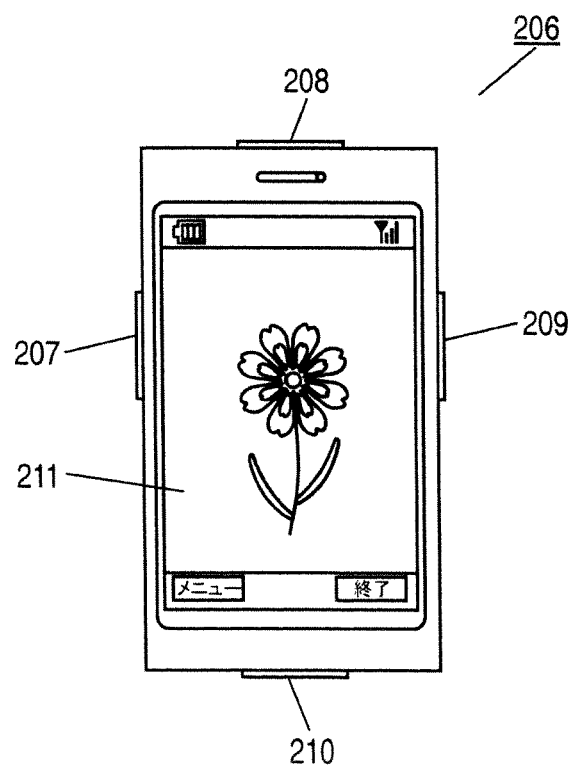
FIG. 20 is an external perspective view of another conventional information apparatus.

FIG. 18 is an enlarged view of information apparatus 131 in accordance with Embodiment 10, and shows a distortion transmitted to board 24 when compressive load F is applied to side surface 22b of housing 22. As shown in FIG. 18, upon having load F applied to a position close to the stress collector 126a inward housing 22, only stress collector 126a but not stress collector 125a presses board 24. Then, board 24 bends between end 24c and supported portion 24p, so that board 24 can bend at a larger curvature than board 24 not supported at the supported portion 24p as observed in the information apparatus 121 in accordance with Embodiment 9.

As shown in FIG. 18, when the distortion is transmitted to board 24 via only stress collector 126a, not via stress collector 126b, a portion of board 24 where strain detector 125a is disposed, namely, the portion of the board between end 24c and the supported portion 24p, bends such that surface 24f becomes convex at the portion where strain detector 125a is disposed. On the other hand, a portion of board 24 where strain detector 125b is disposed, namely the portion of board 24 between end 24d and the supported portion 24p, bends such that surface 24 becomes concave at the portion of board 24 where stress collector 126b is disposed. This configuration allows a polarity of an output from strain detector 125a to be opposite to a polarity of an output from strain detector 125b, thereby increasing the difference between the outputs from strain detectors 125a and 125b.

When the same amount of compressive load F is applied to both of information apparatus 131 according to Embodiment 10 and information apparatus 121 according to Embodiment 9, information apparatus 131 can produce a larger difference between the outputs from strain detectors 125a and 125b than information apparatus 121. The detection sensitivity of information apparatus 131 is thus improved. It was confirmed that, upon having compressive load of 200 gf applied to information apparatus 131 in accordance with Embodiment 10, the difference between outputs from strain detectors 125a and 125b increased by 14% than the information apparatus including board 24 not supported at the supported portion 24p.

In information apparatus 131 in accordance with Embodiment 10, both ends 24c and 24d of board 24 are fixed to housing 22 by inner chassis 122a and 122b; however, only one of ends 24c or 24d of board 24 may be fixed by an inner chassis. This cantilever structure produces similar effects. In this case, one of strain detectors 125a and 125b outputs an equal value to the output in the case of fixing both the ends, and the other strain detector outputs a value equal to the output in the case of the cantilever structure. As discussed above, when the same amount of distortion is applied, strain detectors 125a and 125b output different values, so that processing circuit 24a accurately identify the position on side surface 22b at which compressive load F is applied.

In the embodiments, terms, such as "front surface", "back surface", "side surface, and "back surface", indicating direction merely indicate relative directions depending on only relative positional relations of structural elements, such as the housing and the board, of the information apparatus, and do not indicate absolute directions, such as a vertical direction.

INDUSTRIAL APPLICABILITY

An information apparatus according to the present invention can accurately detect an input by a user, so that the user can operate versatile functions of the apparatus easily. The information apparatus is useful for digital camera, portable PC, portable game machine, portable phone, personal digital assistance (PDA), smart phone and the like.

REFERENCE MARKS IN THE DRAWINGS 22 housing
22b side surface
22c side surface (another side surface)
24 board 24a processing circuit
24c end (second end)
24d end (first end)
24p supported portion
25a strain detector (first strain detector)
25b strain detector (second strain detector)
26a stress collector (first stress collector)
26b stress collector (second stress collector)
112 slit
114 board
114a main surface
114b side surface
114c back surface

The invention claimed is:

1. An information apparatus comprising:
a housing having a side surface;
a first strain detector that detects distortion applied to the side surface of the housing;
a second strain detector that detects distortion applied to the side surface of the housing;
a processing circuit connected electrically to the first strain detector and the second strain detector;
a first stress collector that transmits, to the first strain detector, the distortion applied to the side surface of the housing; and
a second stress collector that transmits, to the second strain detector, the distortion applied to the side surface of the housing,
wherein, upon having a same amount of distortion applied to the side surface of the housing, the first strain detector and the second strain detector are configured to output different output values to the processing circuit.

2. The information apparatus according to claim 1, wherein a distance from the first stress collector to the first strain detector is different from a distance from the second stress collector to the second strain detector.

3. The information apparatus according to claim 1, wherein a shape of the first stress collector is different from a shape of the second stress collector.

4. The information apparatus according to claim 1, wherein, along a direction parallel with the side surface, a distance from a center of the first strain detector to a center of the first stress collector is different from a distance from a center of the second strain detector to a center of the second stress collector.

5. The information apparatus according to claim 1, wherein rigidity of the first stress collector is different from rigidity of the second stress collector.

6. The information apparatus according to claim 1, wherein an output characteristic of the first strain detector with respect to an amount of distortion is different from an output characteristic of the second strain detector with respect to an amount of distortion.

7. The information apparatus according to claim 1, wherein a duration from a time when the first strain detector receives distortion to a time when the first strain detector outputs an output signal in response to the distortion to the processing circuit is different from a duration from a time when the second strain detector receives distortion to a time when the second strain detector outputs an output signal to the processing circuit in response to the distortion.

8. The information apparatus according to claim 1, further comprising
a board accommodated in the housing, the board having the first strain detector and the second strain detector mounted thereto,
wherein the board has a first end which is coupled to the housing and a second end which is opposite to the first end and which is not coupled to the housing.

9. The information apparatus according to claim 8, wherein the board includes a supported portion disposed between the first strain detector and the second strain detector, the supported portion supports the board with respect to the housing.

10. The information apparatus according to claim 8,
wherein the board has a first end closer to the second strain detector than to the first strain detector and a second end opposite to the first end, and
wherein the first stress collector contacts the board between the first strain detector and the second end of the board, and
wherein the second stress collector contacts the board between the second strain detector and the first end of the board.

11. The information apparatus according to claim 8, wherein the first stress collector and the second stress collector contact the board between the first strain detector and the second strain detector.

12. The information apparatus according to claim 1, wherein the housing further includes another side surface disposed on an opposite side to the side surface.

13. An information apparatus comprising:
a housing including a side surface;
a board having both ends coupled to the housing;
a first strain detector mounted to the board;
a second strain detector mounted to the board;
a processing circuit connected electrically to the first strain detector and the second strain detector, the processing circuit being configured to execute a predetermined function;
a first stress collector that transmits, to the first strain detector, distortion applied to the side surface of the housing; and
a second stress collector that transmits, to the second strain detector, distortion applied to the side surface of the housing
wherein the first strain detector outputs a first electric signal in response to an amount of the distortion transmitted by the first stress collector,
wherein the second strain detector outputs a second electric signal in response to an amount of the distortion transmitted by the second stress collector, and
wherein the processing circuit controls the predetermined function in response to the first electric signal and the second electric signal.

14. The information apparatus according to claim 13,
wherein the board has a main surface extending perpendicularly to the side surface of the housing, a back surface opposite to the main surface, and a side edge surface connected to the main surface and the back surface, and
wherein the first stress collector and the second stress collector couple mechanically the side surface of the housing to the side edge surface of the board.

15. The information apparatus according to claim 14,
wherein the board has a slit therein extending substantially in parallel with the side edge surface, and
wherein the first strain detector and the second strain detector are mounted to the main surface between the side edge surface and the slit.

16. The information apparatus according to claim 13, wherein the board includes a supported portion supporting the board between the first second strain detector and the second strain detector with respect to the housing.

17. The information apparatus according to claim 13,
wherein the board has a first end closer to the second strain detector than to the first strain detector, and a second end opposite to the first end,
wherein the first stress collector contacts the board between the first strain detector and the second end of the board, and
wherein the second stress collector contacts the board between the second strain detector and the first end of the board.

18. The information apparatus according to claim 13, wherein the first stress collector and the second stress collector contact the board between the first strain detector and the second strain detector.

19. The information apparatus according to claim 13, wherein the housing further has a further side surface opposite to the side surface.

* * * * *